United States Patent
Bernadat et al.

(10) Patent No.: US 9,341,265 B2
(45) Date of Patent: May 17, 2016

(54) PRIMARY PLASTIC PISTON WITH FUNCTIONAL INSERT FOR A PENETRATION-TYPE MASTER CYLINDER AND A MASTER CYLINDER EQUIPPED WITH SUCH A PISTON

(75) Inventors: Olivier Bernadat, Le Perreux (FR); Laurent Lhuillier, Le Blanc Mesnil (FR); Daniel Grech, Lamorlaye (FR); Marc Rodriguez, Beverley Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 461 days.

(21) Appl. No.: 13/996,711

(22) PCT Filed: Dec. 7, 2011

(86) PCT No.: PCT/EP2011/072038
§ 371 (c)(1),
(2), (4) Date: Dec. 24, 2013

(87) PCT Pub. No.: WO2012/084513
PCT Pub. Date: Jun. 28, 2012

(65) Prior Publication Data
US 2014/0102292 A1   Apr. 17, 2014

(30) Foreign Application Priority Data
Dec. 21, 2010   (FR) .................................. 10 05011

(51) Int. Cl.
*F16J 1/01*   (2006.01)
*B60T 11/16*  (2006.01)
*B60T 11/18*  (2006.01)

(52) U.S. Cl.
CPC .. *F16J 1/01* (2013.01); *B60T 11/16* (2013.01); *B60T 11/18* (2013.01)

(58) Field of Classification Search
CPC ......... B60T 11/16; B60T 11/20; B60T 11/22; B60T 11/224; B60T 17/18; B60T 17/22
USPC .............................. 60/534, 562; 92/248, 255
See application file for complete search history.

(56) References Cited

U.S. PATENT DOCUMENTS

| 4,831,916 A | * | 5/1989 | Leigh-Monstevens | B60T 11/16 403/135 |
| 5,036,751 A | * | 8/1991 | Seip | B60T 11/16 60/533 |

(Continued)

FOREIGN PATENT DOCUMENTS

| CN | 201437356 | 4/2010 |
| FR | 2827244 | 1/2003 |

(Continued)

OTHER PUBLICATIONS

International Search Report dated Apr. 10, 2012, issued in corresponding international application No. PCT/EP2011/072038.

*Primary Examiner* — Thomas E Lazo
(74) *Attorney, Agent, or Firm* — Norton Rose Fulbright US LLP

(57) ABSTRACT

A primary piston is described of molded plastic and equipped with a functional metallic insert and at least one groove. The primary piston is installed in a master cylinder comprising at least the primary piston and a secondary piston, these being mounted in the bore hole of a master cylinder. These pistons can create pressure in a primary pressure chamber and a secondary pressure chamber, respectively, due to the action of a push rod on the primary piston.

8 Claims, 3 Drawing Sheets

(56) References Cited

U.S. PATENT DOCUMENTS

| | | | | |
|---|---|---|---|---|
| 5,161,376 A | * | 11/1992 | Hartmann | B60T 11/232 60/562 |
| 5,617,725 A | * | 4/1997 | Yasuda | B60T 11/16 60/562 |
| 6,886,333 B2 | | 5/2005 | Feigel et al. | |
| 7,047,868 B2 | * | 5/2006 | Nolan | F16J 1/22 92/187 |

FOREIGN PATENT DOCUMENTS

| | | |
|---|---|---|
| JP | 6-92222 | 4/1994 |
| JP | 8-119088 | 5/1996 |
| JP | 10-167039 | 6/1998 |
| JP | 2001-18782 | 1/2001 |
| JP | 2004-28339 | 1/2004 |
| WO | WO 88/08801 | 11/1988 |

\* cited by examiner

PRIMARY PLASTIC PISTON WITH FUNCTIONAL INSERT FOR A PENETRATION-TYPE MASTER CYLINDER AND A MASTER CYLINDER EQUIPPED WITH SUCH A PISTON

FIELD OF THE INVENTION

The present invention relates to a master-cylinder primary piston for an automobile and to vehicle master cylinders equipped with such a piston.

BACKGROUND INFORMATION

Master cylinders known to the state of the art have a primary piston and a secondary piston generally made of aluminum, both of which are installed in series in an axial bore hole of a brake master-cylinder body, generally made of aluminum and machined. Such a master cylinder is described in French Patent No. 2,827,244. A push rod is used to actuate the displacement of the primary piston. The primary piston serves to pressurize a primary pressure chamber and a secondary piston serves to pressurize a secondary pressure chamber. Primary and secondary springs tend to push the pistons in the direction opposite displacement, thereby ensuring the increase in pressure.

The bore hole of the master cylinder is supplied with brake fluid from two supply access holes that are connected to a brake fluid reservoir. The supply access holes are used to supply the primary and secondary pressure chambers. These holes emerge in annular chambers, annular seals known as "cups" being provided on either side of the annular chambers.

The supply of brake fluid to the pressure chambers occurs when the pistons are at rest. The pistons are then in the position shown in FIG. 1. Supply occurs by passages provided in the piston walls, which enable the supply access holes and the annular chambers to communicate with the interior of the primary and secondary pistons emerging respectively in the primary and secondary pressure chambers. When the pistons are moved axially forward (direction of arrow D in FIG. 1), the piston passages cross the seals, isolating the supply chambers and enabling brake pressure to be established in the primary and secondary pressure chambers.

The master cylinder assembly is capable of being installed on a brake-assist servomotor. When the pistons are displaced along the direction of arrow D by a push rod that exercises a selective force on the primary piston, cup 4 isolates the primary pressure chamber of the primary supply access hole and cup 6 isolates the secondary pressure chamber of the supply access hole. When the force on the push rod is released, the volume of brake fluid accumulated in the brakes and springs of the master cylinder pushes the pistons into rest position. At times, when the push rod is rapidly released, the brake fluid contained in the pressure chambers of the master cylinder can drop below atmospheric pressure due to the action of the springs, which push the pistons more rapidly than the ability of brake fluid to flow through the master cylinder. When the pistons reach rest position, communication between the reservoir at atmospheric pressure and the chambers of the master cylinder is directly established and a sudden surge of brake fluid occurs, which generates noise in the master cylinder, known as a "fluid hammer." To improve the performance of master cylinders, it is necessary to provide aluminum master-cylinder pistons with specific shapes, which shapes can result in significant additional costs due to the complexity of their production.

SUMMARY

An object of the present invention is to provide a plastic primary piston for a master cylinder that is easy to produce, economical, and capable of resisting mechanical stress.

An object of the present invention is a master-cylinder piston installed in a brake master cylinder of the type described above, comprising at least the primary piston and a secondary piston installed in a bore hole of the master cylinder. These pistons allow a pressure to be created in a primary pressure chamber and a secondary pressure chamber, respectively, by the action of a push rod on the primary piston, characterized in that the primary piston is of molded plastic material and equipped with a metal insert situated in a receiving cavity of the push rod, where the push rod exercises a force to displace the primary piston and wherein the insert has a specific shape capable of accommodating, on the one hand, the push rod and, on the other hand, an exterior shape enabling it to be maintained in the receiving cavity of the push rod and wherein the piston is preferably made of a thermoset plastic and, more preferably, of phenolic resin filled with glass fibers. The specific shape and hardness of the insert is capable of accommodating the push rod and of resisting deformation of the push rod due to the application of the brakes. The metal insert provides the primary piston with increased mechanical resistance and helps to reduce the thicknesses of plastic materials and make the primary piston more compact.

Another beneficial characteristic is that the body of the primary piston is easily made by injection molding, which allows complex shapes to be produced, such as: grooves, ribs, non-cylindrical holes.

According to another beneficial characteristic, the body of the piston is easily made by injection molding and the primary piston leaving the mold is ready for assembly without requiring any finishing work, unlike the aluminum piston, which requires additional machining.

According to another beneficial characteristic, the body of the piston is easily made by molding thermoset plastic materials, which allow the surface to be ground by machining to improve the reliability of the master cylinder.

According to another beneficial characteristic, the body of the piston is easily made by injection molding plastic materials, which allow noises caused by the brake fluid to be damped.

According to another beneficial characteristic, the insert is made of magnetizable material so that the piston emits a magnetic field capable of being detected by a magnetic-field sensor.

According to another beneficial characteristic, the exterior shape of the metal insert has at least one protrusion whose exterior shape is of slightly greater dimension for forced insertion into the bottom of the receiving cavity of the push rod.

The thickness of the insert is designed to resist a master-cylinder test pressure of 40 MPa, this thickness taking into account the diameter of the primary piston and the bearing section of the push rod.

DETAILED DESCRIPTION

Figure 1:
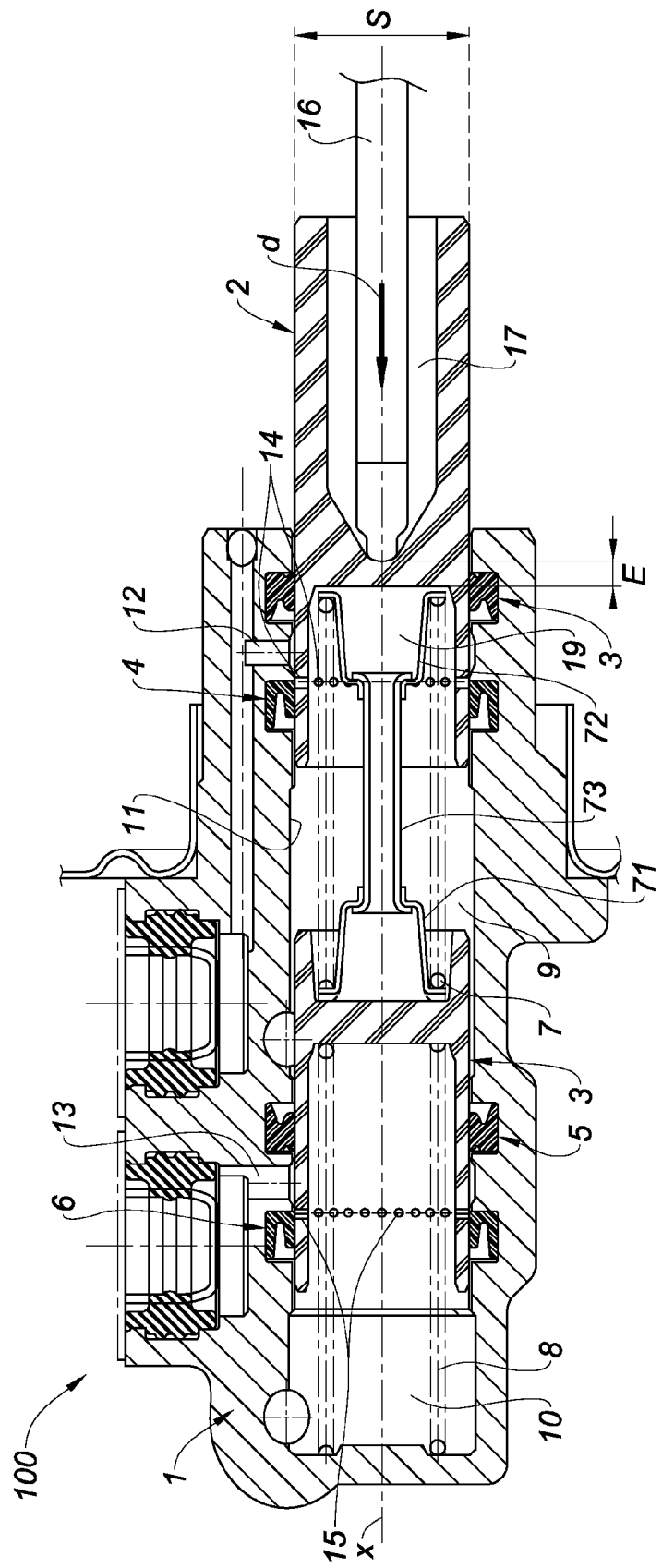
FIG. 1 is an axial cutaway of a master cylinder known to the state of the art and previously described.

In FIG. 1, therefore, we find brake master cylinder 100 having bore hole 11 in which primary piston 2 and secondary piston 3 and primary spring 7 and secondary spring 8 have been placed. Pistons 2 and 3 serve to pressurize, respectively, primary pressure chamber 9 and secondary pressure chamber 10 from brake fluid supply access holes 12 and 13, which are intended to be connected to a brake fluid reservoir (not shown). On either side of access hole 12, cups 3 and 4 are provided and, on either side of access hole 13, cups 5 and 6 are provided. Whenever the master cylinder is at rest, the primary piston is in the position shown in FIG. 1. The exterior piston walls are equipped with passages 14 and 15 and enable holes 12 and 13 to communicate with the interior of the piston and primary pressure chamber 9 and secondary pressure chamber 8. When at rest, cups 4 and 6 allow communication between access holes 12 and 13, primary and secondary pressure chambers 9 and 8 then being supplied with brake fluid.

Whenever, under the effect of a braking force exercised in direction D by push rod 16 placed in cavity 17 of primary piston 2, primary piston 2 is moved in the direction of arrow D, cup 6 blocks passages 15 and cup 4 blocks passages 14. Because primary and secondary pressure chambers are thereby isolated from holes 12 and 13, a pressure is established in chambers 9 and 10, this pressure being proportional to the force exercised in direction D by push rod 16 placed in cavity 17 of primary piston 2. The external diameter S of primary piston 2 forms a section on which the pressure of the primary chamber acts. In cavity 17 of the primary piston, push rod 16 applies a force to generate a pressure in the master cylinder but on a diameter that is appreciably smaller, at a minimum 4 times smaller. This creates significant stress at the primary piston and requires a minimum thickness of material E between the receiving cavity of push rod 27 and forward cavity 19, where a primary spring pack is found, including of two spring ends 71, 72, rod 73, and the primary spring.

Figure 2:
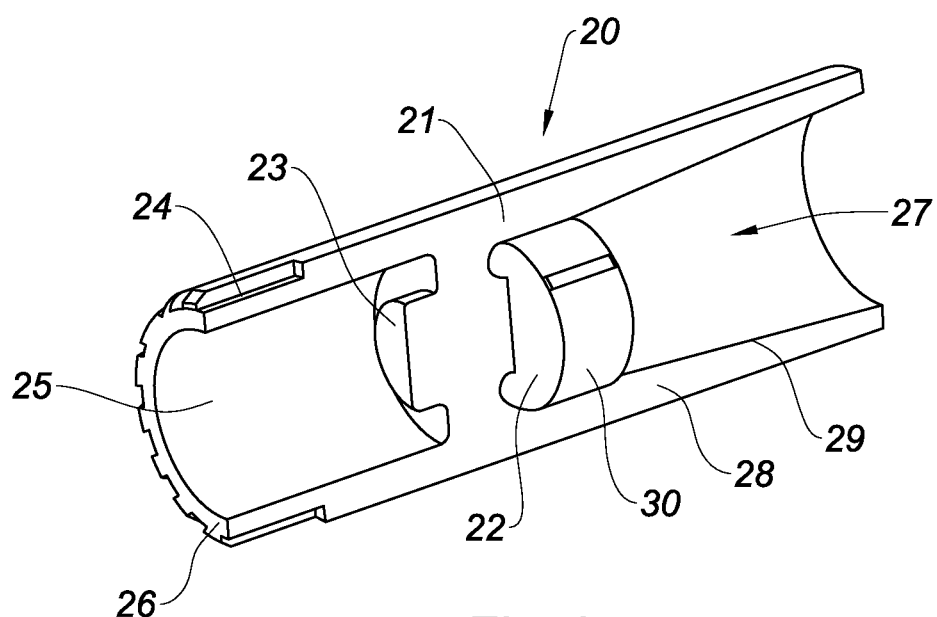
FIG. 2 is an isometric view with a partial cutaway of an embodiment of a master-cylinder piston according to the invention, with grooves on the front of the piston.
Figure 3:
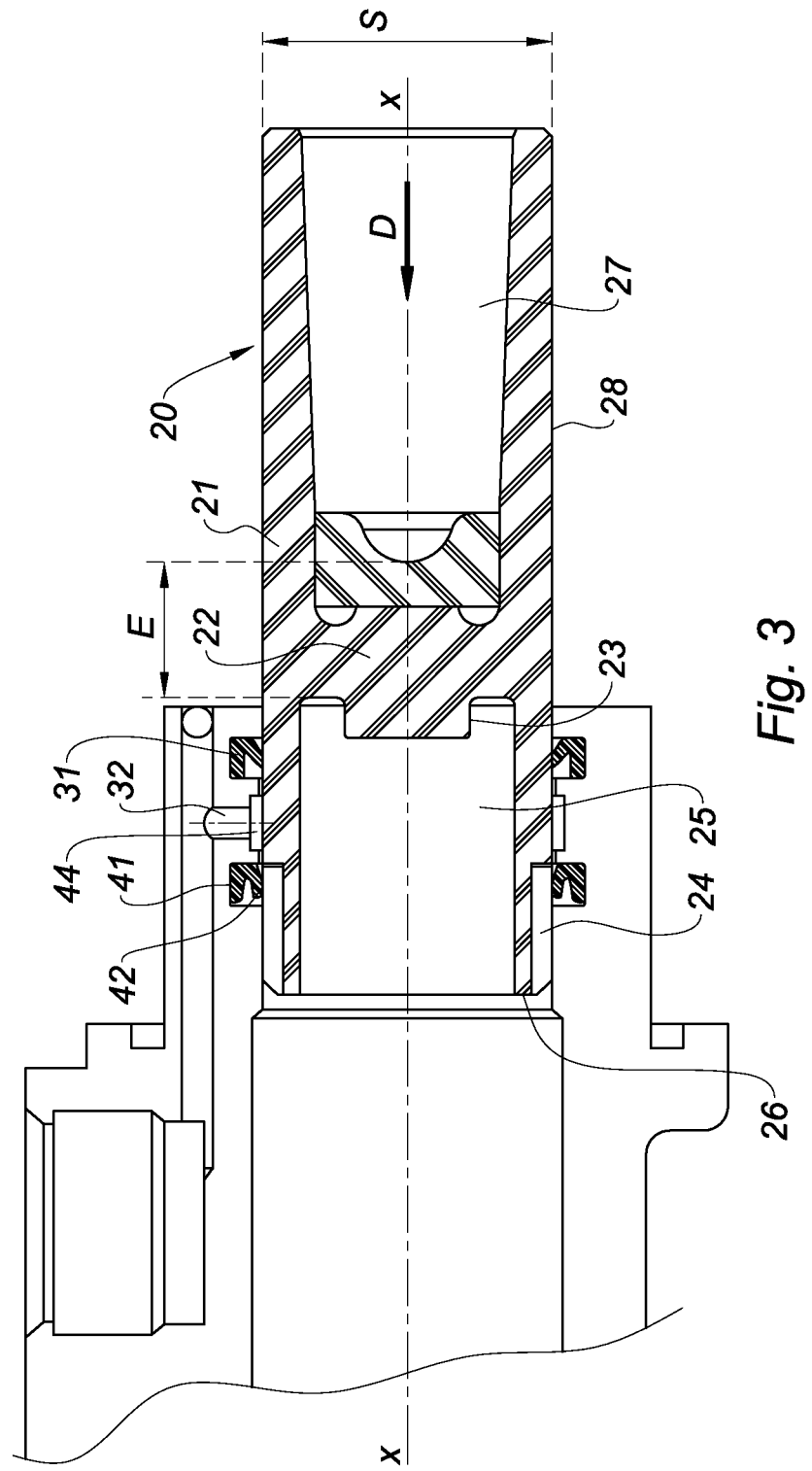
FIG. 3 is a partial axial view of an embodiment of a portion of a master cylinder according to the invention.

FIGS. 2 and 3 show a master-cylinder primary piston according to the invention, characterized in that primary piston 20 is of molded plastic material and equipped with a metallic insert 22 situated behind forward cavity 25 of the primary piston and in a receiving cavity of push rod 27, where the push rod exerts a force to move the primary piston and generate pressure in the master cylinder, and wherein piston 20 has at least one groove 24 and the insert has the shape of a spherical cap capable of accommodating the push rod and an external shape capable of maintaining it in the receiving cavity of push rod 27. The hardness of insert 22 is capable, on the one hand, of accommodating the push rod and, on the other, of resisting deformation of the push rod due to the application of the brakes.

Grooves 24 are of sufficient length so that, when the master cylinder is at rest, the grooves allow brake fluid to pass beneath seal point 42 of cup 41 and emerge in annular chamber 44 situated between cups 31 and 41. These grooves 24 form passages between the pressure chamber and the annular chamber connected to the reservoir, not shown, by hole 32. It would have been possible to realize grooves 24 of aluminum but this would have resulted in significant additional costs. The use of plastic materials helps to reduce costs because the shapes of the grooves can be incorporated into the mold. The use of those same plastic materials requires that thicknesses be increased and additional material be used to overcome the difference in the mechanical resistance of the materials. The plastic body and metallic insert confer upon the primary piston an increased mechanical resistance and allow the thickness E of the plastic materials to be reduced and piston 20 to be more compact and, therefore, the invention, through the placement of the insert between forward cavity 25 and the receiving cavity of push rod 27, provides the benefits of the mechanical resistance of aluminum and the ease of manufacture of complex shapes such as grooves through the use of plastic materials that can be molded. Moreover, the compactness of the primary piston also allows the master cylinder to be more compact and results in savings on master-cylinder materials.

Another advantageous characteristic is that body 21 of piston 20 is easily made by injection molding, which allows for the realization of complex shapes such as grooves 24.

According to another advantageous characteristic, the body of the piston is easily made by molding thermoset plastic materials, which allow surface 28 to be ground by machining to improve the reliability of the master cylinder.

According to another characteristic, the exterior surface 30 of metal insert 22 has at least one protrusion whose dimension is slightly greater than its exterior shape for forced insertion into the bottom of the receiving cavity of the push rod and which cooperates with the interior surface 29 of cavity 27.

According to another characteristic, the exterior surface 30 of metal insert 22 has irregular anchors that cooperate with interior surface 29 of cavity 27.

According to another advantageous characteristic, insert 22 is cylindrical and its exterior surface 30 has at least one rib cooperating with interior surface 29 of cavity 27.

According to another advantageous characteristic, the master cylinder has a primary piston 20 and an insert 22 made of magnetizable material so that the piston emits a magnetic field capable of being detected by a magnetic-field sensor.

The invention claimed is:

1. A primary piston for a penetration-type tandem brake master cylinder, comprising:
 a body made of a molded plastic material and including a forward cavity; and
 a metallic insert located behind the forward cavity and in a receiving cavity of a push rod, wherein the push rod exerts a force to displace the primary piston and generate a pressure in the master cylinder;
 at least one groove, wherein:
  the metallic insert has a shape of a spherical cap for accommodating the push rod, and
  an exterior shape of the metallic insert includes at least one protrusion having a dimension that is slightly greater than the exterior shape for forced insertion into a bottom of the receiving cavity of the push rod.

2. The primary piston according to claim 1, wherein the molded plastic material includes a thermoset plastic material.

3. The primary piston according to claim 1, wherein a surface of the primary piston is ground by machine.

4. The primary piston according to claim 1, wherein the primary piston is made of a plastic material capable of damping noise.

5. The primary piston according to claim 1, wherein an exterior surface of the metallic insert includes irregular anchors that cooperate with an interior surface of the receiving cavity.

6. The primary piston according to claim 1, wherein the metallic insert is cylindrical and includes an exterior surface that includes at least one rib cooperating with an interior surface of the receiving cavity.

7. A master cylinder, comprising:
at least a primary piston and a secondary piston installed in a bore hole of the master cylinder, wherein:
the primary piston includes a body made of a molded plastic material and equipped with a metallic insert, located in a receiving cavity of a push rod, where the push rod exerts a force to move the primary piston and a primary pressure chamber, and
the metallic insert includes a specific shape to accommodate, on the one hand, the push rod and, on the other hand, an exterior shape that includes a protrusion having a dimension that is slightly greater than the exterior shape for forced insertion into a bottom of the receiving cavity.

8. The master cylinder according to claim 7, wherein the metallic insert includes a magnetizable material so that the primary piston emits a magnetic field capable of being detected by a magnetic field sensor.

* * * * *